(12) United States Patent
Glöckner

(10) Patent No.: US 6,435,087 B1
(45) Date of Patent: Aug. 20, 2002

(54) PRINTING PRESS CYLINDER HAVING METAL FOAM INTERIOR AND METHOD OF MAKING

(75) Inventor: Erhard Herbert Glöckner, Eibelstadt (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/380,589

(22) PCT Filed: Mar. 3, 1998

(86) PCT No.: PCT/DE98/00612

§ 371 (c)(1),
(2), (4) Date: Sep. 10, 1999

(87) PCT Pub. No.: WO98/40214

PCT Pub. Date: Sep. 17, 1998

(30) Foreign Application Priority Data

Mar. 11, 1997 (DE) .......................... 197 09 672

(51) Int. Cl.[7] ................................. B41F 13/08
(52) U.S. Cl. ................. 101/217; 101/376; 101/493; 492/48; 492/54; 492/58
(58) Field of Search ................. 101/216, 217, 101/375, 376, 401.1, 483, 492, 493; 492/18, 25, 46, 48, 49, 53, 54, 58, 57; 29/895.21; 427/244, 247, 373

(56) References Cited

U.S. PATENT DOCUMENTS

| | | | |
|---|---|---|---|
| 3,087,807 A | | 4/1963 | Allen et al. |
| 3,830,288 A | | 8/1974 | Laing |
| 3,902,845 A | * | 9/1975 | Murphy ....................... 432/60 |
| 4,142,338 A | | 3/1979 | Becker |
| 4,341,157 A | | 7/1982 | Simeth ....................... 101/375 |
| 4,428,290 A | * | 1/1984 | Junghans et al. ........... 101/348 |
| 4,852,230 A | * | 8/1989 | Yu ............................... 29/432 |
| 5,151,246 A | * | 9/1992 | Baumeister et al. ........... 419/2 |
| 5,206,992 A | * | 5/1993 | Carlson et al. .......... 29/895.21 |
| 5,226,365 A | | 7/1993 | Weiland ..................... 101/328 |
| 5,365,842 A | | 11/1994 | Panossian ................... 101/216 |
| 5,609,554 A | * | 3/1997 | Hayashi et al. ................ 492/56 |
| 5,786,051 A | | 7/1998 | Niggemeier et al. |
| 5,836,499 A | | 11/1998 | Mullet et al. |

FOREIGN PATENT DOCUMENTS

| | | |
|---|---|---|
| DE | DT 2119490 | 1/1972 |
| DE | 3012060 A1 | 2/1987 |
| DE | 4018360 C1 | 5/1991 |
| DE | 4119825 C1 | 12/1992 |
| DE | 4426627 A1 | 2/1995 |
| DE | 29514164.6 | 1/1997 |
| DE | 4443840 C2 | 5/1997 |
| DE | 19545597 A1 | 6/1997 |
| DE | 19709672 A1 | 9/1998 |
| EP | 0519301 A1 | 6/1992 |
| EP | 0832740 A2 | 6/1992 |
| JP | 63193863 | * 8/1988 |

* cited by examiner

Primary Examiner—Leslie J. Evanisko
(74) Attorney, Agent, or Firm—Jones, Tullar & Cooper, P.C.

(57) ABSTRACT

A printing press cylinder for a rotary printing press is light in weight and has vibration dampening properties. A metal foam filling is placed inside the cylinder.

12 Claims, 1 Drawing Sheet

PRINTING PRESS CYLINDER HAVING METAL FOAM INTERIOR AND METHOD OF MAKING

FIELD OF THE INVENTION

The present invention relates to a cylinder for printing presses in which the interior of the cylinder, and possibly the cylinder barrel is at least partially filled with, or made of a metal foam.

DESCRIPTION OF THE PRIOR ART

Rollers and cylinders of different dimensions for printing presses are known which, because of the material used for them, have a large dead weight.

This is disadvantageous not only from the viewpoint of the large expenditure of material, but also because of the required large outlay in energy and time in the course of accelerating and braking the rotating rollers or cylinders.

It is furthermore known, particularly in connection with slim cylinders, for example plate cylinders, that the so-called "channel beat" or "channel drop" excites oscillations in the radial direction, which, among other things, can lead to irregularities in the drive, as well as to oscillation bands and loss of printed characters in the printed product.

For example, in accordance with DE-OS 30 12 060, cylinders for printing presses which are immune to oscillations are known. These cylinders are put together from several pieces and in which materials of different physical properties are used for oscillation damping.

DE 44 26 627 A1 describes a metallic composite material with a core of a porous metallic material.

U.S. Pat. No. 4,341,157 discloses a cylinder for a printing press. This cylinder has hollow spaces which, for the purposes of weight reduction and oscillation damping, while at the same time maintaining its strength, are filled with a damping material.

SUMMARY OF THE INVENTION

It is the object of the present invention to create a cylinder for rotary printing presses.

In accordance with the present invention, this object is attained by providing a cylinder with a tube-shaped outer jacket whose interior is at least partially filled with a metal foam. Alternatively, the cylinder barrel can be made of a metal foam.

The advantages which can be achieved by means of the present invention reside, in particular, in that the rollers or cylinders have a reduced weight, along with simultaneously reduced bending, as well as oscillation-damping properties. A satisfactory damping effect, for example in connection with channel beats, or channel drops, as well as a reduced weight are achieved by means of the presence of hollow spaces. Thus, rapid as well as energy-reduced acceleration or deceleration of the rollers or cylinders is made possible. In case of a web guide roller in particular, which is driven by the running paper web, an easily moving as well as slip-free drive is of advantage. Because of its reduced mass, the web guide roller is already driven slip-free by a running quarter-wide paper web.

In particular, the cylinder has good heat conducting properties because of the use of metal foam.

A rapid removal of the heat being created in the cylinders is made possible by the heat conducting properties of the metal-containing material.

In comparison with conventional cylinders, it is possible, by means of the use of metal foam, and with the same bending to reduce the weight, and therefore the moment of mass inertia.

BRIEF DESCRIPTION OF THE DRAWINGS

Preferred embodiments of the present invention are represented in the drawings and will be described in greater detail in what follows. Shown are in.

DESCRIPTION OF THE PREFERRED EMBODIMENTS

A cylinder 1 for a rotary printing press consists of two lateral or end disks 2, 3, which are firmly connected with a tube-shaped, or cylindrical jacket 4. The jacket 4 can have, for example, an exterior radius $r_a$ of 50 to 300 mm and a wall thickness of, for example, four to twelve millimeters and consist of a ferrous metal, for example steel, or a non-ferrous metal, for example aluminum. In particular, the ratio $r_i/r_a$ of the interior radius $r_i$ to the exterior radius $r_a$ of the jacket 4 is $\leq 0.92$ ($r_i/r_a < 0.92$). The interior radius $r_i$, the exterior radius $r_a$, the length l and the maximum bending $u_{max}$ of the tube-shaped jacket 4 have the following relationship:

$$u_{max} = 1.25 \times 10^{-5} (l/r_a)^3 / (1 - (r_i/r_a)^4).$$

The assigned interior radius r, of the cylinder, which is filled with metal foam, is determined, in accordance with this equation, from the predetermined maximum bending $u_{max}$, the length l and the exterior radius $r_a$.

Figure 1:
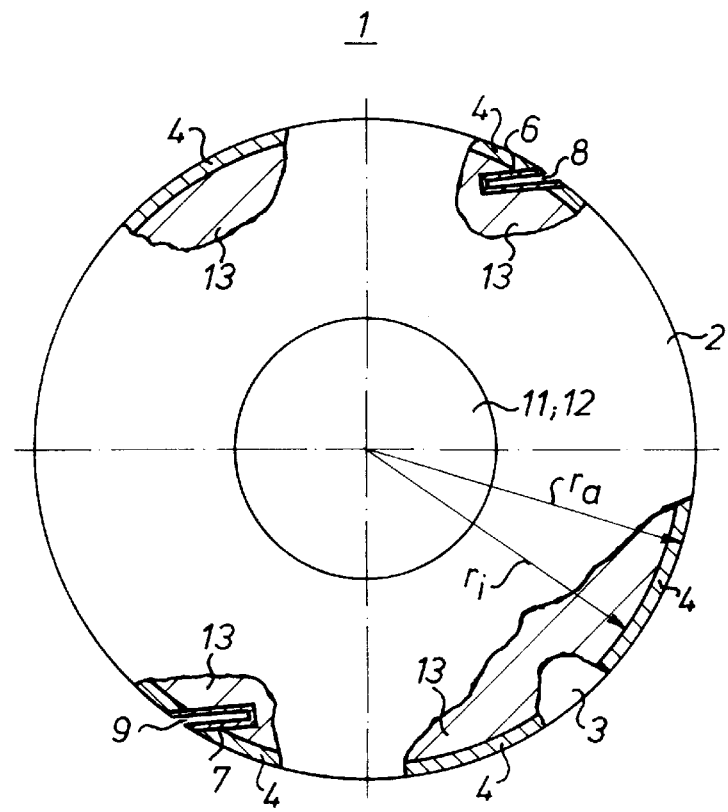
FIG. 1, a front view of a schematically represented cylinder of the present invention in accordance with a first preferred embodiment with the cylinder including a tube-shaped jacket; and in FIG. 2, a longitudinal sectional view of the left end of a schematically represented web guide roller in accordance with a second preferred embodiment of the present invention.

For fastening the beveled edges of flexible plates to the cylinder 1, it is possible, for example, to arrange two cross bars 6, 7, which firmly connect to the lateral end disks 2, 3, and which have slits 8, 9 extending in the axial direction of the cylinder 1, on the circumference of the cylinder 1. The plates can be designed as printing plates, or as plates with a rubber layer, for example for a rubber blanket cylinder. Shaft journals 11 and 12 are respectively fastened in a manner fixed against relative rotation on the exterior of the lateral disks 2, 3, as depicted in FIG. 1. The interior of the cylinder 1 is filled at least partially, but preferably completely, with a metal foam 13, which will be described in greater detail subsequently.

The jacket 4 can also be produced or provided without the slits 8, 9, for example if cylinder 1 is to be used as a counter-pressure cylinder.

In accordance with another preferred embodiment, a cylinder of a diameter of approximately 80 to 160 mm has the dimension of a web guide roller 14. The web guide roller 14 has a cylinder-shaped cylinder barrel 16, which is made of metal foam 13. The self-supporting cylinder barrel 16 of the web guide roller 14 has bearing bushings 17 and ball bearings 18, respectively on the front or end, which are respectively engaged by an axle journal 19 fixed in place on the lateral frame.

Figure 2:
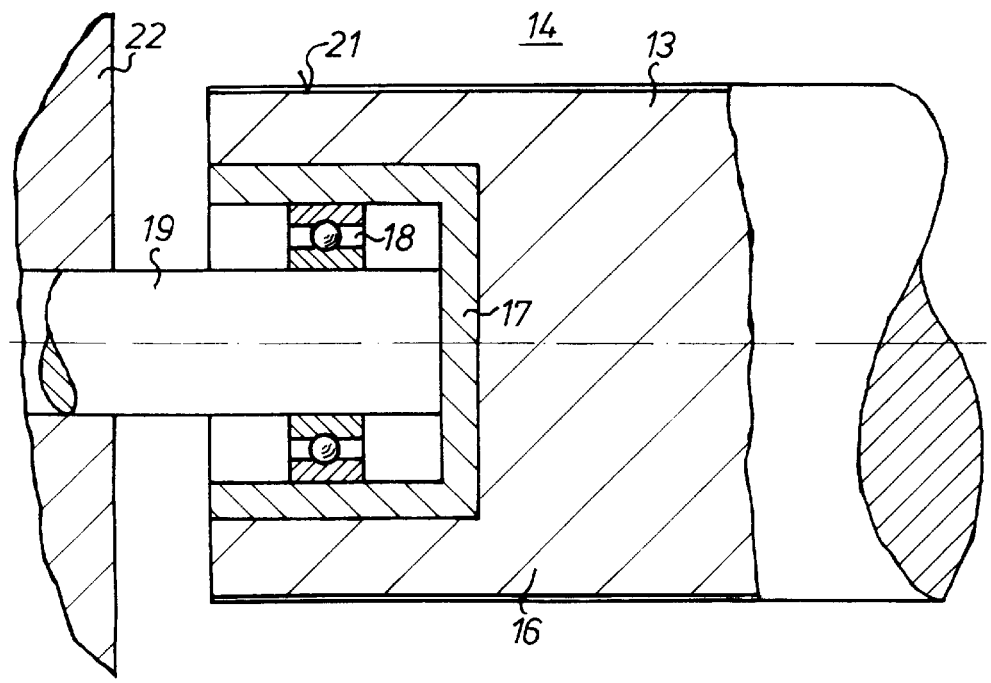

A surface 21 of the cylinder barrel 16 of the self-supporting web guide roller 14 is sealed with a jacket of plastic, for example as may be seen in FIG. 2.

In accordance with another preferred embodiment, the surface 21 of the cylinder barrel 16 of the self-supporting web guide roller 14 can also be provided with a cover or jacket of sheet metal, for example a cover or jacket in the form of a metal tube with a wall thickness of approximately one millimeter.

The cylinders 1, 14 can also respectively be rotatably seated on a shaft which is not specifically represented, and which is firmly clamped between lateral frames 22—only one of which is represented in FIG. 2. It is moreover possible to connect the two shaft journals 11, 12 represented in FIG. 1 continuously, i.e. firmly connected to each other, for example, and to seat the ends rotatably in the lateral frame 22, as described.

Metal foam consists of a porous metal body which, for example, is produced in accordance with the following process steps described in DE 40 18 360 C1:

a) Production of a mixture of at least one metal powder, for example pure aluminum, and at least one expander powder, from which a gas is split off, for example a carbonate, at a proportion of 0.1 percent by weight.

b) This intimately mixed powder mixture is heated by means of hot pressing, for example at a pressure of 60 MPa, to a temperature of approximately 500° C. and maintained there for about 30 minutes. A semi-finished product is created. In this case the metal particles are predominantly connected by diffusion. The existing pressure prevents the decomposition of the gas particles. The metal particles, which are connected with each other, have enclosed the gas particles of the expander.

c) The semi-finished product made in this way is, for example, introduced into the tube-shaped jacket 4 and is brought to a temperature, for example 800° C., which lies above the decomposition temperature of the expander. In the process, the semi-finished product is expanded, and the metal foam 13 being created in this way preferably completely fills the tube-shaped jacket 4 and thereby is welded to the interior surface of the tube-shaped jacket 4 so that the metal foam 13 is completely connected to the interior surface of the tube-shaped jacket 4.

d) The cylinder 1, which has now been metal foamed on the inside, is thereafter cooled. The pore size lies between one and three millimeters in diameter.

It is also possible that the foaming of the semi-finished material in accordance with Item c) takes place freely, i.e. without the jacket 4. This can be done by means of deformation, for example. After a body, for example a web guide roller 14, has been produced, the cylinder barrel 16 of the web guide roller 14 is coated or sealed. This can be done, for example, by means of an ink-repellent synthetic resin.

The bearing bushings 17 can be fastened in bores in the front or end faces of the web guide roller 14, as shown in FIG. 2, also by means of a synthetic resin or adhesive.

The jacket 4 preferably is made of steel. The metal foam 13 therefore has ferrous metal components.

While preferred embodiments of a printing press cylinder in accordance with the present invention have been set forth fully and completely hereinabove, it will be apparent to one of skill in the art that various changes in, for example, the plate end fastening devices, the type of printing press in which the cylinder can be used, and the like can be made without departing from the true spirit and scope of the present invention which is accordingly to be limited only the following claims.

What is claimed is:

1. A cylinder for use in a printing press, said cylinder comprising:

a tube-shaped metal cylinder jacket, said metal cylinder jacket having an inner jacket surface with an interior radius and an outer jacket surface with an exterior radius, a ratio of said interior radius to said exterior radius being no greater than 0.92; and a metal foam cylinder barrel in said tube-shaped metal cylinder jacket, said metal foam cylinder barrel being heat expanded within said tube-shaped metal cylinder jacket, said inner jacket surface being connected with said metal foam cylinder barrel during said heat expansion of said metal foam cylinder barrel within said tube-shaped metal cylinder jacket, said metal foam cylinder barrel cooperating with said tube-shaped metal cylinder jacket to facilitate the removal of heat from said cylinder.

2. The cylinder of claim 1 wherein said cylinder is a forme cylinder.

3. The cylinder of claim 1 wherein said cylinder is a printing cylinder.

4. The cylinder of claim 1 wherein said cylinder is a web guide cylinder.

5. The cylinder of claim 1 further including bearing bushings secured to said cylinder, said bearing bushings being adapted to be engageable by axle journals on lateral frames of the printing press.

6. The cylinder of claim 1 further including shaft journals secured to said cylinder and connected, fixed against relative rotation, with said cylinder.

7. The cylinder of claim 1 wherein said metal foam consists of a mixture of at least one metal powder and at least one expander powder from which a gas is split off.

8. The cylinder of claim 1 wherein said metal foam forms a porous metal body.

9. The cylinder of claim 1 wherein said metal foam consists at least partially of a ferrous metal.

10. The cylinder of claim 1 wherein said metal foam consists at least partially of a non-ferrous metal.

11. A method for producing a cylinder for use in a rotary printing press including:

producing a mixture of at least one metal powder having metal particles and at least one expander powder having gas particles, treating said mixture of said at least one metal powder and said at least one expander powder by heat and pressure;

forming a semi-finished product at a first temperature, wherein combination of said metal particles of said at least one metal powder takes place predominately by diffusion, and wherein said pressure is sufficiently high for preventing decomposition of said expander powder, said metal particles being in firm connection with each other and constituting a gas tight enclosure for said gas particles of said expander powder;

introducing said semi-finished product into a tube-shaped metal cylinder jacket having an inner jacket surface;

bringing said tube-shaped metal cylinder jacket and said semi-finished product to a second temperature, said second temperature being higher than said first temperature, said second temperature further lying above a decomposition temperature of said expander powder and in a temperature range of a melting point of said metal powder;

forming a metal foam cylinder barrel in said tube-shaped metal cylinder jacket, said metal foam cylinder barrel having said metal particles at said second temperature;

connecting said inner jacket surface of said metal cylinder jacket with said metal particles of said metal foam cylinder barrel at said second temperature to form said cylinder for use in a rotary printing press;

cooling said cylinder; and arranging said cylinder in a rotary printing press.

12. A cylinder in a rotary printing press comprising:

a tube-shaped cylinder jacket having an interior radius ($r_i$), an exterior radius ($r_a$), a length (l) and a cylinder interior; and a metal foam at least partially filling said cylinder interior, a maximum bending, ($U_{max}$) of said tube-shaped cylinder jacket being defined as:

$$U_{max} = 1.25 \times 10^{-5} (l/r_a)^3 / (1-(r_i/r_a)^4).$$

* * * * *